United States Patent [19]

Gomi

[11] E Re. 29,745

[45] Reissued Aug. 29, 1978

[54] PRINTER

[75] Inventor: Yoshifumi Gomi, Chino, Japan

[73] Assignees: Shinshu Seiki Kabushiki Kaisha; Kabushiki Kaisha Suwa Seikosha, both of Tokyo, Japan

[21] Appl. No.: 736,045

[22] Filed: Oct. 27, 1976

Related U.S. Patent Documents

Reissue of:

[64] Patent No.: 3,878,778
Issued: Apr. 22, 1975
Appl. No.: 322,840
Filed: Jan. 11, 1973

[30] Foreign Application Priority Data

Jan. 11, 1972 [JP] Japan ..... 47-5379
Jan. 17, 1972 [JP] Japan ..... 47-6816

[51] Int. Cl.[2] ..... B41J 9/38
[52] U.S. Cl. ..... 101/93.29
[58] Field of Search ..... 101/93.29–93.34, 101/93.48, 93.14, 93.02

[56] References Cited

U.S. PATENT DOCUMENTS

| | | | |
|---|---|---|---|
| 3,049,990 | 8/1962 | Brown et al. | 101/93.47 |
| 3,279,362 | 10/1966 | Helms | 101/93.29 |
| 3,351,006 | 11/1967 | Belson | 101/93.02 |
| 3,355,659 | 8/1967 | Schacht et al. | 101/93.02 |
| 3,416,442 | 12/1968 | Brown et al. | 101/93.14 |
| 3,459,106 | 8/1969 | Nyman | 101/93.29 |
| 3,707,122 | 12/1972 | Cargill | 101/93.34 |

*Primary Examiner*—Edward M. Coven

*Attorney, Agent, or Firm*—Blum, Moscovitz, Friedman & Kaplan

[57] ABSTRACT

A printer has a plurality of print hammers displaceable between a rest position and a print position, and respective deformable elastic bodies maintained in a deformed position by each print hammer in its rest position and biasing the print hammer toward its print position. Respective magnetic circuit control means are selectively operable to hold each print hammer in its rest position and to release the print hammer for displacement to the print position by the respective elastic body. Each magnetic circuit control means includes a permanent magnet, a first hammer-hold magnetic circuit including a portion of the respective hammer and a second release magnetic circuit including a release coil operable to release the print hammer from its rest position responsive to a print command signal thereto in a direction to increase the magneto-motive force in the second magnetic circuit with a corresponding decrease in the magneto-motive force in the first magnetic circuit to release the respective print hammer for movement to its print position by the associated elastic body. The second magnetic circuit has a magnetic reluctance greater than that of the first magnetic circuit. The first and second magnetic circuits are connected in parallel with the permanent magnet. In one embodiment of the invention, the greater magnetic reluctance is provided by an adjustable air gap in the second magnetic circuit. In another embodiment of the invention, the two magnetic circuits are connected in parallel with the permanent magnet through a common air gap having a reluctance greater than that of the print hammer portion in the first magnetic circuit.

9 Claims, 4 Drawing Figures

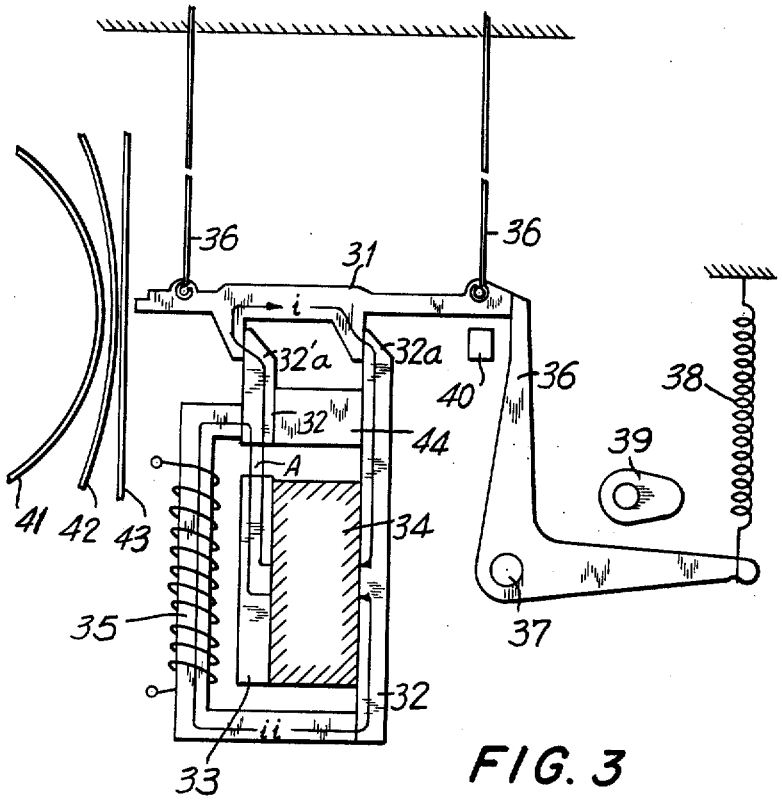
FIG. 3
FIG. 4
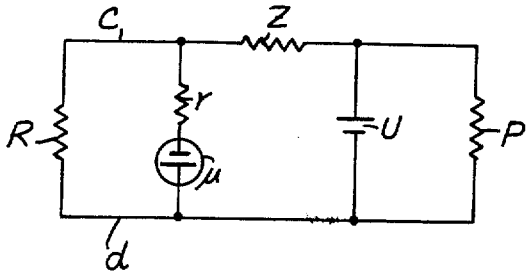

PRINTER

Matter enclosed in heavy brackets [ ] appears in the original patent but forms no part of this reissue specification; matter printed in italics indicates the additions made by reissue.

FIELD AND BACKGROUND OF THE INVENTION

This invention relates to control means for the print hammers of a printer and, more particularly, to such a control means in which the print hammers are retained in a rest position by magnetic circuit means and are displaced into the print position by the stored energy of deformable elastic bodies maintained in a deformed position by each print hammer in its rest position, the release of each print hammer being effected in response to a print command signal.

Various hammer mechanism have been proposed for high speed mechanical printers used as the output section in information handling devices. Many such printers are of the "flying" type wherein the characters to be printed are carried by a drum, a belt, or a chain which is continuously rotated, printing being effected by striking a recording device, such as a paper, against the character to be printed by means of a print hammer without interrupting the rotation of the character carrier. In a high speed printer, printing speed, and thus the speed of movement of the character carriers is extremely high. This requires rapid and precise movement of the hammer in order to assure the hammer squarely striking the correct character to assure accurate and clear printing.

Prior art flying printers generally utilized the attractive forces of an electromagnet to displace the hammer. Such arrangements generally require the use of a lever to transmit the energy, resulting from the magnetic attraction of the electromagnet, to the hammer. In other words, the hammer is directly supplied with kinetic energy or printing energy through a lever due to the attractive force of the electromagnet and, in such an arrangement, as the print energy and the kinetic energy of the lever must be supplied by the electromagnet in a very short time, the efficiency of the electromagnet is low and a very large power is required. In turn, this requires a large-scale power device which also results in the generation of substantial heat.

SUMMARY OF THE INVENTION

In accordance with the invention, a hammer mechanism is provided wherein the hammer can be controlled by a small current, whereby the above-mentioned disadvantages are avoided. More particularly, a printer embodying the invention has at least one print hammer displaceable between a rest position and a print position, a deformable elastic body maintained in a deformed position by the print hammer in a rest position and biasing the print hammer toward its print position, and magnetic circuit control means selectively operable to hold the print hammer in its rest position and to release the print hammer for displacement to the print position by the respective elastic body responsive to a print command signal. The magnetic circuit control means includes a permanent magnet, a first hammer-hold magnetic circuit including a portion of the respective print hammer, and a second release magnetic circuit including a release coil. The first and second magnetic circuits are connected in parallel with the permanent magnet.

The magnetic circuit control means normally retains the print hammer in its rest position by magnetomotive force applied to the print hammer, and this magnetomotive force is decreased upon excitation of the release winding, responsive to a print command signal, in a direction to increase the magnetomotive force in the second magnetic circuit with a corresponding decrease in the magnetomotive force in the first magnetic circuit, thus to release the print hammer for movement to its print position by the elastic body.

The second magnetic circuit, in accordance with the invention, has a magnetic reluctance greater than that of the first magnetic circuit. In one embodiment of the invention, the increased magnetic reluctance of the second magnetic circuit is provided by an adjustable air gap in the second magnetic circuit, with the magnetic reluctance of the second magnetic circuit being larger than that of the hammer hold portion included in the first magnetic circuit. The magnetic flux flowing through the release coil, which is non-effective for holding the print hammer in the rest position, is reduced, so that the effective magnetic flux in the first hammmer-hold magnetic circuit is increased.

If a comparatively large reluctance were not provided in the release coil portion, the magnetic flux of the permanent magnet would be divided into the hammer-hold circuit and the circuit containing the release coil, when no current is flowing in the release coil. In such a case, it is necessary to make the volume of the permanent magnet large in order to obtain the necessary magnetic flux in the hammer-hold first magnetic circuit to hold the hammer in its rest position.

In accordance with the invention, the magnetic flux flowing through the second magnetic circuit containing the release coil, and which is not directly necessary to hold the print hammer in its rest position, is reduced resulting in there being a greater effective magnetic flux in the hammer-hold first magnetic circuit.

The amount of the magnetic flux flowing through the hammer-hold first magnetic circuit can be adjusted according to the magnitude of the reluctance inserted in the release coil second magnetic circuit. This can be effected, for example, by adjusting the air gap in the second magnetic circuit.

In a printer embodying the invention and utilizing a plurality of hammers arranged in the direction of columns, for example, a line printer, the objective of the invention is to adjust the time, following the supply of current through the release coil, required to release the hammer from the rest position, by variably adjusting the reluctance in the second magnetic circuit containing the release coil.

In another embodiment of the invention, the first and second magnetic circuits are connected in parallel with the permanent magnet through a reluctance larger than that of the hammer portion in the hammer-hold first magnetic circuit.

An object of the invention is to provide a printer wherein a hammer is held in a rest position by magnetic force generated by a permanent magnet while storing energy in an elastic body such as a spring.

Another object of the invention is to provide a hammer control mechanism for a printer and which may be actuated by a relatively small control current.

A further object of the invention is to provide such a printer in which magnetic circuit control means for each hammer includes a permanent magnet, a first hammer-hold magnetic circuit including a portion of a respective hammer and a second release magnetic circuit including a release coil, and in which the reluctance of the second magnetic circuit is substantially greater than that of the hammer-hold magnetic circuit.

Another object of the invention is to provide such a printer in which the first and second magnetic circuits are connected in parallel with the permanent magnet through a magnetic reluctance substantially greater than the magnetic reluctance of the hammer-hold portion.

Still other objects and advantages of the invention will in part be obvious and in part be apparent from the specification and drawings.

The invention accordingly comprises the features of construction, combinations of elements, and arrangement of parts which will be exemplified in the constructions hereinafter set forth and the scope of the invention will be indicated in the claims.

BRIEF DESCRIPTION OF THE DRAWINGS

For a fuller understanding of the invention, reference is had to the following description taken in connection with the accompanying drawings, in which:

FIG. 3 is a view similar to FIG. 1 illustrating another embodiment of the invention; and FIG. 4 is a schematic electrical diagram corresponding to the magnetic circuitry of the embodiment of the invention shown in FIG. 3.

DESCRIPTION OF THE PREFERRED EMBODIMENTS

Figure 1:
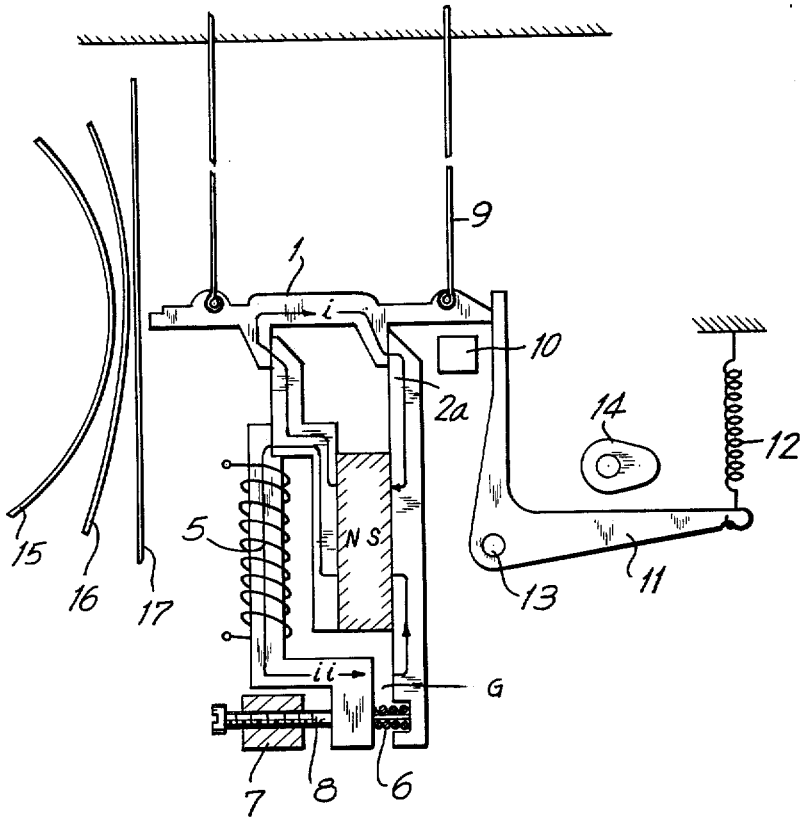
FIG. 1 is a partially sectioned side elevation view of the operative portion of one column of a printer in accordance with one embodiment of the invention.

Referring first to FIG. 1, one column of a printer embodying the invention is illustrated as including a print hammer 1 suspended by parallel flexible springs 9. The column further includes magnetic material yokes 2 and 3 extending in spaced substantially parallel relation from the opposite polarity pole faces of a permanent magnet 4 and having respective attractive faces 2a and 3a forming a hammer-hold arrangement. A release coil or winding 5 is provided for releasing hammer 1 from the hammer-hold elements 2a and 3a. In the magnetic circuit comprising permanent magnet 4, hammer-hold portions 2a and 3a are release coil 5, the hammer-hold portions 2a, 3a and the release coil are disposed in parallel relation with permanent magnet 3.

The magnetic flux flowing from permanent magnet 4 is divided into the magnetic flux loop i which is effective for holding hammer 1 in its rest position indicated in FIG. 1, and the magnetic loop ii which is not directly effective for holding hammer 1. Release coil 5 is connected magnetically with yoke 2 through the air gap G, and gap G is maintained by a spring 6 disposed in the gap between release coil portion 5 and yoke 2. An adjusting screw 8 is threaded through a fixed element 7 for adjusting the magnitude of gap G. By changing the magnitude of gap G, the reluctance of the release coil portion is changed, and the amount of the magnetic flux flowing through the magnetic flux loop ii is changed in addition to which the amount of the magnetic flux flowing through the hammer-hold loop i can be changed.

Furthermore, by providing the air gap G, one part of the magnetic flux, flowing through magnetic flux loop ii, can be utilized effectively to control the magnetic flux flowing through the hammer-hold circuit i, as compared with a case where the air gap G is not provided. Consequently, the volume of permanent magnet 4 can be substantially decreased.

A lever 11, swingable about a pivot 13, is provided for transmitting the force of a spring 12, for driving hammer 1, to the hammer 1, and a stop 10 is provided to limit movement of transmitting lever 11 in the hammer driving direction. A cam 14 is provided to reset the hammer, and forms one part of a return mechanism for returning hammer 1 to its rest position indicated in FIG. 1. A print drum, on which characters are disposed, is indicated at 15 in association with an ink ribbon 16, whereby printing may be recorded on a paper 17 by operation of hammer 1.

Hammer 1 is attracted magnetically and held in the hammer rest position by the attractive faces 2a and 3a, forming the hammer-hold means, when no printing is to be effected, and is biased in the direction of drum 15, through transmitting lever 11 under the bias of spring 12, for driving the hammer, it being noted that, in the rest position, spring 12 constitutes a deformable elastic body which is maintained in a deformed position. When a selected character on drum 15 approaches a position opposed to hammer 1, current is supplied to release coil 5 to flow through coil 5 in a direction such as to increase the amount of the magnetic flux in the magnetic circuit ii. Thereby, the magnetomotive force in the hammer-hold circuit i is decreased and the amount of the magnetic flux flowing in the circuit i is reduced. When the magnetic force holding the hammer in its rest position is less than the force exerted on the hammer by spring 12, hammer 1 is released from the holding or rest position and is actuated toward the character on drum 15. The hammer 1 is supplied with the printing energy through lever 11 under the bias of spring 12 until lever 11 strikes stop 10, after which hammer 1 is actuated by its kinetic energy and strikes paper 17 and ink ribbon 16 against the selected character to perform the printing.

Hammer 1 is returned to its rest position by actuation of reset cam 14 to engage lever 11 and swing the latter clockwise. As hammer 1, under the action of its flexible suspension springs 9, approaches attractive faces 2a and 3a, hammer 1 is attracted by the magnetic force due to permanent magnet 4. In the rest state, when reset cam 14 is disengaged from transmitting lever 11, hammer 1 is held in its rest position stressing spring 12, and remains in its rest position, with spring 12 stressed, until a further print command signal is given to release coil 5.

Figure 2:
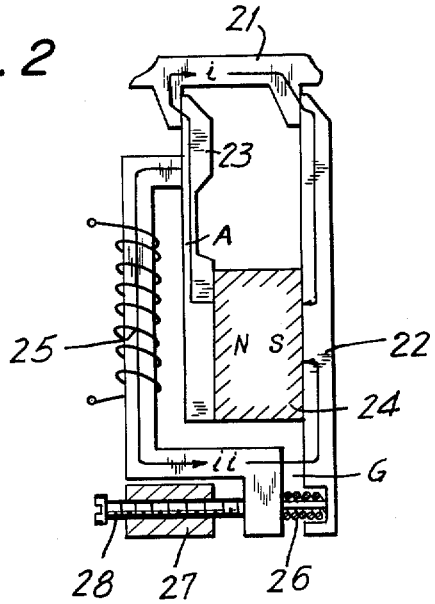
FIG. 2 is a partial sectional side elevation view of one column of a printer and illustrating a modification.

In the modification of the invention shown in FIG. 2, the first hammer-hold magnetic circuit i and the second release coil magnetic circuit ii are connected in parallel with each other with permanent magnet 4 through magnetic saturation area A of magnetic yoke 23. In the same manner as in the arrangement of FIG. 1, the magnetic saturation area A is maintained constant when hammer 21 is held in its rest position. The effective magnetic flux in the hammer-hold circuit i is increased by providing the air gap G in the magnetic circuit ii including the release coil 25, in the same manner as in FIG. 1. Hammer 21 can be released from its rest position by exciting the release coil 25 in the direction of increasing the amount of magnetic flux flowing through the magnetic circuit ii. The arrangement includes the yoke 22 which, with yoke 23, is engaged with permanent magnet 4, the two yokes being engaged with permanent magnet faces of respective opposite polarities. A spring 26 is again provided in air gap G and the air gap may be adjusted in magnitude by a screw 28 threaded through a fixed member 27. Thus, the operation of the invention is the same irrespective of the method of connecting permanent magnet 24 into the magnetic circuit i and ii. Also, the effective magnetic flux flowing through the hammer-hold magnetic circuit i, for holding the hammer, can be adjusted by adjusting air gap G and thus changing the reluctance in the magnetic circuit ii, whereby adjustment of the various printing columns can be easily effected.

In a printer including a plurality of hammers disposed in the directions of columns, such as a line printer, the invention, as shown in FIGS. 1 and 2, has a substantial advantage in that the time elapsing between the application of a signal to the release coil until the hammer strikes a character can be maintained constant, for all of the hammers, by adjusting the respective air gaps G to adjust the magnetic forces holding the hammers in the rest position, thereby preventing unevenness of printed characters such as would be caused by shifting of the striking position at the time of striking the hammer against the character.

Furthermore, it has been ascertained experimentally that the print hammer can be controlled with a very small value of current flowing through the release coil, because the value of the current is determined substantially equal for each column in accordance with the magnitudes of the respective air gap G.

The arrangement of FIGS. 1 and 2 provides a comparatively small hammer mechanism wherein the hammer can be controlled with a small controlling current and the power consumption is small, and furthermore an arrangement in which the timing adjustment for the hammers can be performed very simply. The advantages are very great and of great utility.

In the embodiment of the invention shown in FIG. 3, a print hammer 31 is again suspended from parallel flexible springs 36 and is attracted to the attractive faces 32a and 32'a, forming a hammer-hold arrangement, further including a holder 44 of non-magnetic material for mounting attractive face 32'a on magnetic yoke 32. Magnetic yoke 32 is an engagement with one polarity face of permanent magnet 34, and a magnetic yoke 33 is in engagement with the opposite polarity face of permanent magnet 34 and is connected magnetically with yoke portion or attractive face 32'a through an air gap A'.

The hammer-hold magnetic circuit i comprises permanent magnet 4 and hammer-hold portions 32a and 32'a, and the hammer-release magnetic circuit ii is connected in parallel with the hammer-hold magnetic circuit i with permanent magnet 34. The magnetic circuit ii comprising release coil 35, and the hammer-hold magnetic circuit i are connected magnetically with permanent magnet 34 through the comparatively large reluctance in air gap A' between yoke 32' and yoke 33, the yoke 32' having the magnetic attractive face 32'a.

The transmitting lever 36, pivoted at 37, is provided for transmitting the bias of a spring 38, for driving hammer 31, to hammer 31, and a stop 40 limits counter clockwise movement of lever 36 under the bias of spring 38. A reset cam 39 is provided for returning lever 36 to the rest position in which spring 38 is tensioned. The character drum is indicated at 41 in association with an ink ribbon 12 and recording paper 13. Hammer 31 is pressed by spring 38 through lever 36, and is held in the rest position, illustrated in FIG. 3, by the magnetically attractive faces 32a and 32'a.

The action of the mechanism shown in FIG. 3 will be explained with respect to the rest state in which hammer 31 is illustrated in FIG. 3 as attracted and held at attractive faces 32a and 32'a by the magnetic flux loop or circuit i. The magnetic holding force is understood to be superior to the force exerted by spring 38, and so as not to be influenced by external influence such as, for example, temperature changes.

FIG. 4 illustrates an electric circuit equivalent to the magnetic circuit shown in FIG. 3. In FIG. 2, the magnetomotive force of permanent magnet 34 is indicated at U, and the magnetomotive force applied to release coil 35 is indicated at $\mu$. The magnetic reluctance in the hammer-hold circuit i is indicated at R, and that in the release coil circuit ii is indicated as r. The magnetic reluctance in the air gap A is indicated at Z, and B indicates the reluctance determined by the leakage magnetic flux.

FIG. 3 illustrates only one hammer column but, in practice, when the hammer column is used in a line printer, for example, hammers are arranged in each column. In such a case, permanent magnet 34 can be used in common for all of the columns. The magnetic circuits i including the hammer-hold portion, and the magnetic circuit ii, including release coil 35, are connected magnetically in parallel with permanent magnet 34 through the air gap A which has a magnetic reluctance larger than that of the hammer-hold circuit. The hammer is released from the hammer-hold circuit i in a manner which will now be explained.

Release coil 35 is excited in the direction of increasing the magnetic flux in the circuit ii of FIG. 3, responsive to a print command signal, namely in the direction of the magnetic reluctance $\mu$ shown in FIG. 4. The magnetomotive force U is changed only slightly when the magnetomotive force $\mu$ is applied, because the magnetic reluctance Z is substantially greater than the magnetic reluctance R. Accordingly, when the magnetomotive force $\mu$ is applied, the magnetomotive force between the conductors c and d is decreased and the magnetic flux flowing through the hammer-hold circuit i is reduced. When the hammer-hold force is smaller than the force exerted by spring 38, hammer 31 is released from its rest position and is actuated, by spring 38 acting through lever 36, in the direction of a character on drum 41. Thus, printing is performed.

It should be noted that the magnetic flux flowing through reluctance R of the hammer-hold circuit i can be reduced to zero by applying a magnetomotive force $\mu = rU/Z$. However, in practice it is not necessary to lower the magnetic flux flowing through the reluctance R to zero.

After release of hammer 21 from the hammer-hold arrangement, the hammer is supplied with print energy by driving spring 38 through transmitting lever 36 until lever 36 strikes stop 40. After that, hammer 21 is actuated in the direction of the character on drum 41 by the transformed kinetic energy to perform the printing. To return hammer 21 to its rest position, reset cam 39 is actuated to swing lever 36 clockwise, with hammer 21 being returned toward attractive faces 32a and 32'a under the resilience of suspending springs 36 until it is attracted by the magnetomotive force of permanent magnet 34, release coil 35 being de-energized at this time. Cam 39 is then disengaged from transmitting lever 36 and hammer 21 is held in its rest position with spring 38 being under tension so that energy is stored in the deformable elastic body constituted by the spring 38. Thereby the hammer is ready for the next printing with one printing operation being completed. In the embodiment of the invention shown in FIG. 3 of control means for print hammers, the print energy is stored in a deformable elastic body, such as a spring, and each of the hammers is supplied with printing energy by the respective deformed elastic bodies responsive to a print command signal. The control means includes the first magnetic circuit i for holding the print hammer in its rest position by utilizing the magnetic force of a permanent magnet while deforming the elastic body, and includes the second magnetic circuit ii including the release coil 35 for releasing the print hammer from the hammer-hold arrangement responsive to a print command signal. The first and second magnetic circuits are connected in parallel with the permanent magnet 34 through a reluctance larger than that of the hammer-hold portion of hammer 31, so that the magnetic flux flowing through the hammer-hold magnetic circuit i is reduced by supplying a small current through release coil 35 to release hammer 21 from its rest position. Thus, a substantial advantage is provided in that the hammer can be actuated with a very small operating current and the hammer control mechanism has a very small power consumption.

It will thus be seen that the objects set forth above, and those made apparent from the preceding description, are efficiently attained and, since certain changes may be made in the above constructions without departing from the spirit and scope of the invention, it is intended that all matter contained in the above description as shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a printer having respective control means for print hammers which are arranged in a plurality of columns and each of which is displaceable between a rest position and a print position, and having respective deformable elastic bodies maintained in deformed condition by the associated print hammers in the rest position, improved magnetic circuit control means associated with each of said columns for [selectively] holding each said print hammer at its rest position and *selectively* releasing same for displacement to a print position including a permanent magnet [common to at least two of said columns], a first hammer hold magnetic circuit portion associated with each print hammer including a portion of the associated print hammer and a second release magnetic circuit portion associated with each print hammer including release coil means and means for adjusting the magnetic reluctance of the release magnetic circuit portion said release coil means including means for applying signals thereto, said first and second magnetic circuit portions being connected in parallel with said permanent magnet, each of said magnetic circuit control means being adapted to hold said respective hammers in said rest position and to release said respective hammer upon application of a signal to its release coil means by means of said signal applying means in a direction so as to decrease the magnetomotive force applied to said hammer, the energy stored in the respective deformed body displacing said respective hammer from said rest position to said print position upon said decrease in said magnetomotive force.

2. In a printer as claimed in claim 1, wherein said magnetic reluctance adjusting means is an adjustable air gap.

3. In a printer, the improvement claimed in claim 1, in which said first and second magnetic circuits connected in parallel with said permanent magnet through a common magnetic saturation area of said magnetic circuit control means.

4. In a printer, the improvement claimed in claim 1, including a respective two armed lever for each print hammer having one arm engaging the print hammer and the other arm connected to a spring constituting the deformable elastic body.

5. In a printer, the improvement claimed in claim 4, including means limiting pivoting movement of each lever in a direction toward the print position of the associated print hammer.

6. In a printer, the improvement claimed in claim 4, including cam means selectively engageable with each lever to restore the lever to the rest position of the associated print hammer.

7. In a printer, the improvement which comprises a print hammer displaceable between a rest and print position; an elastic body maintained in deformed position by said print hammer at said rest position; a magnetic circuit control means for selectively holding said hammer at said rest position and releasing same for displacement to said print position including a permanent magnet, a first hammer hold magnetic circuit portion including a portion of said hammer, and a second release magnetic circuit portion including a control coil means, said first and second magnetic circuit portions being connected in parallel through a common reluctance means with said permanent magnet, said common reluctance means having a magnitude greater than the reluctance of said first hammer hold magnetic circuit portion, said magnetic circuit control means being adapted to hold said print hammer at said rest position and to release said print hammer upon the application of a signal to said control coil means in a direction so as to decrease the magnetomotive force applied to said print hammer, the energy stored in said deformed elastic body displacing said print hammer from said rest position to said print position upon said decreased magnetomotive force.

8. In a printer as claimed in claim 7, wherein said common reluctance means is an air gap.

*9. In a printer as claimed in claim 1, said permanent magnet being common to at least two of said columns.*

* * * * *